July 19, 1966   L. J. SIMONAR ETAL   3,261,408
STONE PICKER

Filed May 4, 1964   5 Sheets-Sheet 1

Lawrence J. Simonar
Bernard J. Simonar
Norbert A. Simonar
INVENTORS

BY *Clarence A. O'Brien*
*and Harvey B. Jackson*
Attorneys

July 19, 1966　　　L. J. SIMONAR ETAL　　　3,261,408
STONE PICKER

Filed May 4, 1964　　　　　　　　　　　5 Sheets-Sheet 2

Lawrence J. Simonar
Bernard J. Simonar
Norbert A. Simonar
INVENTORS

BY
Attorneys

July 19, 1966    L. J. SIMONAR ETAL    3,261,408
STONE PICKER

Filed May 4, 1964    5 Sheets-Sheet 4

Lawrence J. Simonar
Bernard J. Simonar
Norbert A. Simonar
INVENTORS

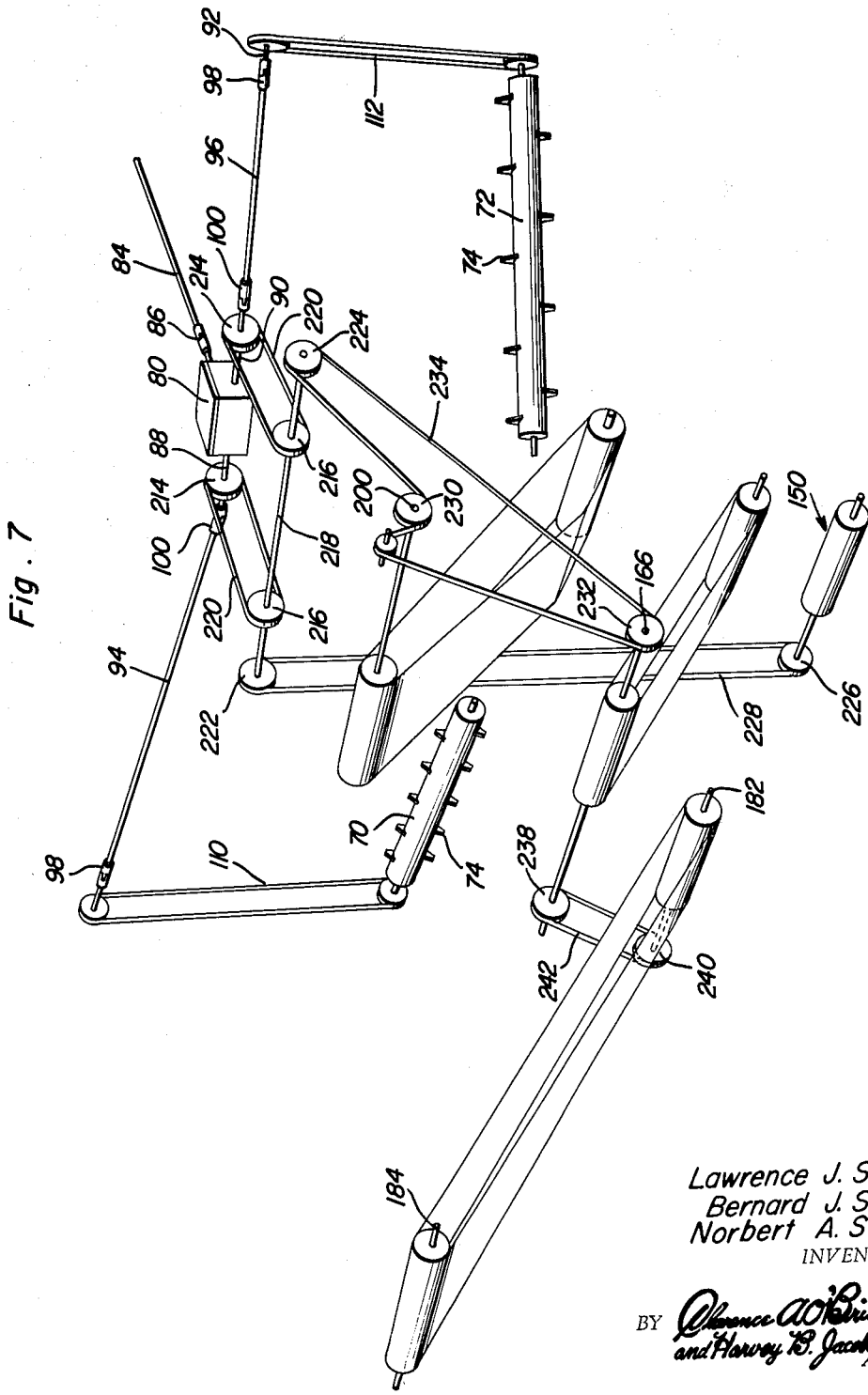

United States Patent Office 3,261,408
Patented July 19, 1966

3,261,408
STONE PICKER
Lawrence J. Simonar, Bernard J. Simonar, and Norbert A. Simonar, all of Rte. 1, Sturgeon Bay, Wis.
Filed May 4, 1964, Ser. No. 364,729
8 Claims. (Cl. 171—63)

This invention relates to a novel and useful stone picker and more specifically to an apparatus designed to dig up, convey and pick up stones and deposit them in a suitable receptacle disposed adjacent the stone picker of the instant invention.

The stone picker of the instant invention includes a main frame having front and rear ends and ground-engaging support wheels and the frame is provided with a pair of elongated digging members which are journaled from the main frame for rotation about their longitudinal axes, the digging members being substantially horizontally disposed, forwardly divergent and spaced apart at their rear ends defining a throat therebetween. The digging members include generally radially extending digging elements spaced circumferentially thereabout and longitudinally thereof and suitable means is provided for driving the digging members.

The digging members are disposed closely adjacent the ground over which the stone picker travels and rotation of the digging members causes the digging elements thereon to engage and penetrate the earth loosening rocks and stones embedded in the earth. Inasmuch as the digging members are rotated so that their lower portions swing forwardly, the stones engaged by the digging members are propelled forwardly by the digging members and laterally displaced toward the center of the machine and the throat defined between the adjacent ends of the digging members.

Stone pickup means is also supported from the frame and disposed immediately rearwardly of the throat between the adjacent ends of the digging members and is operative to pick up the larger rocks and stones discharged into the throat between the adjacent ends of the digging members and to elevate the rocks and stones rearwardly and upwardly while simultaneously treating the stones in a manner such that quantities of soil and smaller stones clinging thereto will be dislodged and allowed to fall to the ground.

The main object of this invention is to provide a stone picker constructed in a manner adapting it to be utilized advantageously in many different areas where several types of stones are encountered.

Still another object of this invention is to provide a stone picker that will dig, gather and pick up stones and rocks and deposit them in a suitable receptacle in one operation.

Still another object of this invention is to provide a stone picker in accordance with the immediately preceding object which may be readily operated by a single workman.

Yet another object of this invention is to provide a stone picker in accordance with the preceding objects constructed in a manner whereby the rocks and stones being dug and elevated are treated in a manner whereby clumps of dirt as well as smaller particles of stones and gravel are dislodged from the larger stones and allowed to fall to the ground.

Another object of this invention is to provide a stone picker constructed in a manner whereby it will dig and pick up rocks and stones buried beneath the surface of the ground over which the machine travels as well as stones which are disposed on the surface of the ground.

Another important object of this invention is to provide a stone picker in accordance with the immediately preceding object including means by which the working depth of the stone picker may be readily adjusted during operation of the stone picker.

A final object of this invention to be specifically enumerated herein is to provide a stone picker constructed in accordance with the preceding objects which will conform to conventional forms of manufacture, be of simple construction and easy to operate so as to provide a device that will be economically feasible, long-lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 5 is an enlarged fragmentary horizontal sectional view taken substantially upon the plane indicated by the section line 5—5 of FIGURE 3;

FIGURE 6 is an enlarged transverse vertical sectional view taken substantially upon the plane indicated by the section line 6—6 of FIGURE 3; and FIGURE 7 is a diagrammatical view in perspective illustrating the drive train for driving the various driven components of the stone picker.

Figure 1:
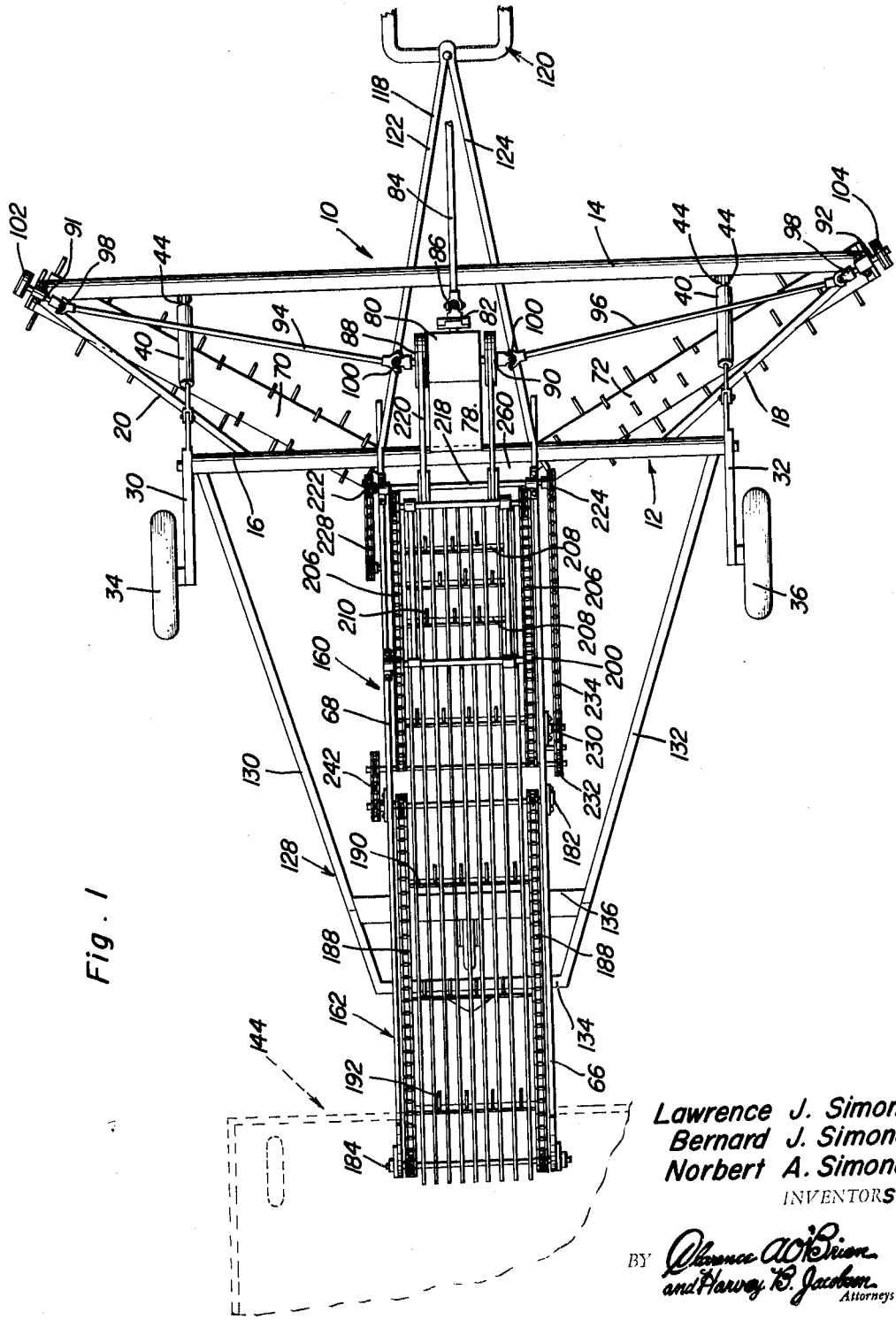
FIGURE 1 is a top plan view of the stone picker of the instant invention.
Figure 2:
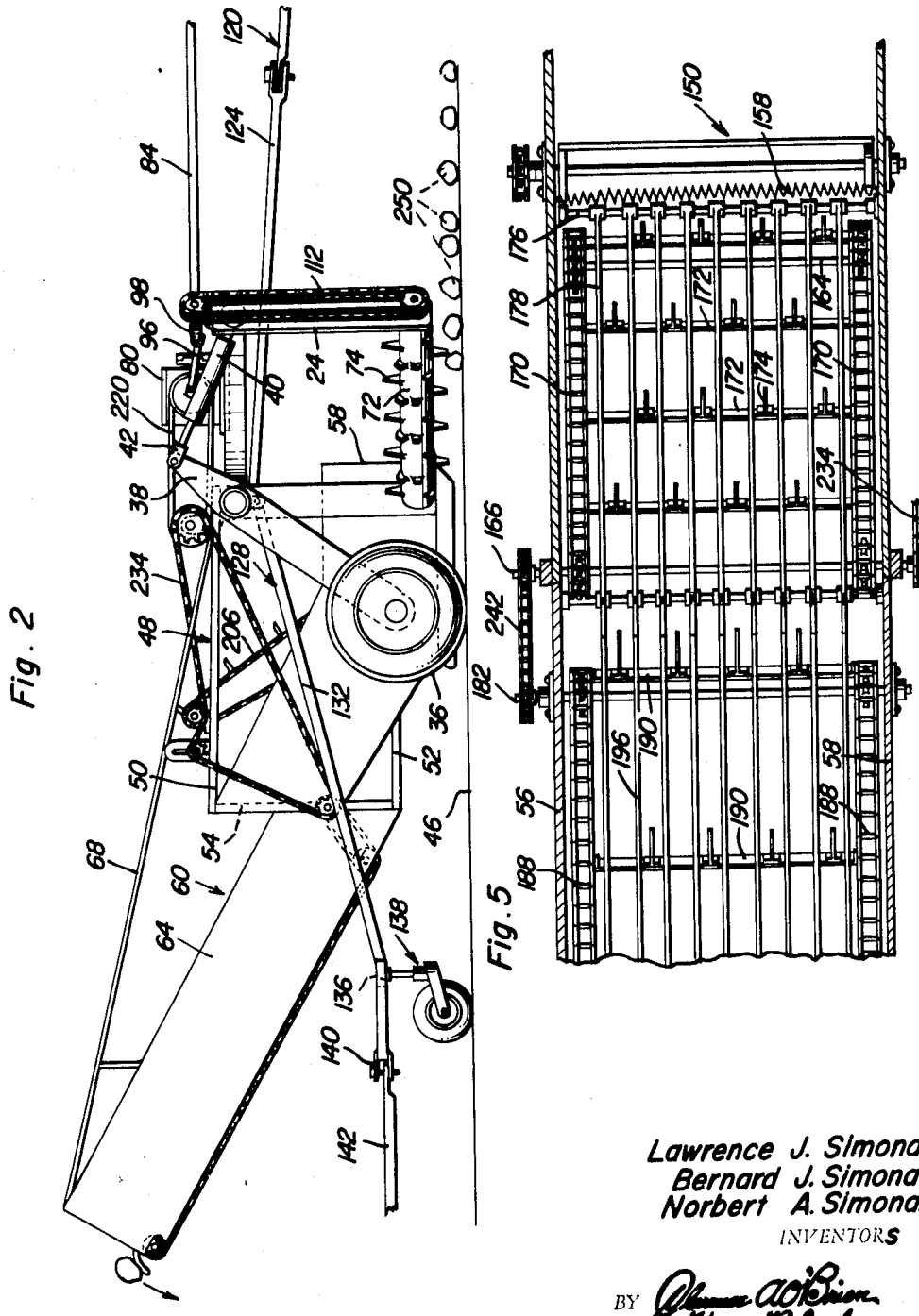
FIGURE 2 is a side elevational view of the embodiment illustrated in FIGURE 1.

Referring now more specifically to the drawings the numeral 10 generally designates a stone picker of the instant invention which includes a main frame generally referred to by the reference numeral 12.

The main frame 12 includes a pair of front and rear transverse upper long and short transverse brace members 14 and 16 which are interconnected at correspondnig ends by forwardly divergent brace members 18 and 20. In addition, the frame 12 includes a pair of opposite side depending support members 22 and 24 which are dependingly supported from the opposite ends of the transverse brace member 14. Still further, a pair of depending support members 26 and 28 are dependingly supported from the opposite end portions of the transverse brace member 16. While the support members 22 and 24 are supported from the terminal end portions of the brace member 14 and the support members 26 and 28 are spaced inwardly from the opposite ends of the brace member 12. However, a pair of depending wheel supporting members 30 and 32 are journaled from the opposite end portions of the brace member 16 and rotatably journal a pair of ground-engaging support wheels 34 and 36 at their lower ends. Each of the depending wheel support members 30 and 32 includes an upper end portion 38 which projects above the transverse brace member 16 and has one end of an extensible fluid motor 40 pivotally secured thereto by means of a bifurcated bracket 42. The other end of each fluid motor 40 is pivotally supported from a corresponding pair of apertured mounting legs 44 supported from the transverse brace member 14. It is to be noted that each of the fluid motors 40 may be operatively connected to a suitable source of hydraulic fluid under pressure and therefore that the wheel supporting members 32 may be adjustably rotated to raise and lower the frame 12 relative to the ground 46 on which the ground-engaging wheels 34 and 36 are supported.

The frame 12 also includes a rear portion generally referred to by the reference numeral 48 and including pairs of laterally spaced and longitudinally extending upper and lower brace members 50 and 52 whose forward ends are secured to the corresponding support members 26 and 28. The rear ends of corresponding upper and lower brace members 50 and 52 are interconnected by means of rear upstanding brace members 54 and a pair of opposite side shields 56 and 58 are secured to the opposite sides of the rear section or portion of the frame 12. Still further, the rear portion 48 of the frame 12 further includes a rear terminal end portion generally referred to by the reference numeral 60 and including a pair of generally parallel and rearwardly and upwardly projecting side panels 62 and 64 which are supported at their lower ends from the corresponding brace members 54 and at their upper ends by means of a pair of tension members 66 and 68 secured between the upper ends of the side panels 52 and 64 respectively and the forward ends of the corresponding brace members 50.

A pair of elongated generally horizontally disposed digging members 70 and 72 are journaled between the support members 22 and 26 and the support members 24 and 28, respectively, and have mounted thereon a plurality of circumferentially and longitudinally spaced digging elements 74 which are generally blade-like in configuration and project radially outwardly from the digging members 70 and 72. The blade-like digging elements 74 are disposed in planes extending at generally right angles to the axes of rotation of the corresponding digging members 70 and 72 and are adapted to engage and penetrate the ground 46.

A support frame 78 is secured to and projects forwardly of the transverse brace member 16 and supports the differential assembly 80 thereon. The differential assembly 80 includes an input shaft 82 to which the rear end of a drive shaft 84 is operatively coupled by means of the universal joint 86. The differential assembly 80 also includes a pair of transversely extending output shafts 88 and 90 which project laterally outwardly from opposite sides of the differential assembly and a pair of short input shafts 91 and 92 are journaled from the upper ends of the support members 22 and 24. A pair of drive shafts 94 and 96 are provided with universal joints 98 and 100 on their opposite ends and drivingly connect the output shafts 88 and 90 to the input shafts 91 and 92, respectively.

The outer ends of the input shafts 91 and 92 have driving wheels 102 and 104 mounted thereon while the remote ends of the digging members 70 and 72 have driving wheels 106 and 108 mounted thereon which are aligned with the driving wheels 102 and 104. A pair of endless flexible drive members 110 and 112 drivingly connected the driving wheel 102 to the driving wheel 106 and the driving wheel 104 to the driving wheel 108.

The transverse brace member 16 also has a tow hitch 118 pivotally secured thereto for towing the machine 10 behind a draft vehicle generally referred to by the numeral 120. The tow hitch 118 includes a pair of rearwardly diverging hitch arms 122 and 124 which are secured together at their forward ends and which are pivotally secured to apertured mounting lugs 126 dependingly supported from the transverse brace members 16 adjacent the support members 26 and 28. In addition, a trailing hitch assembly generally referred to by the reference numeral 128 is provided and includes a pair of forwardly diverging arms 130 and 132 whose forward ends are pivotally supported from the mounting lugs 127. The arms 130 and 132 are interconnected at their rear ends by means of a transverse brace member 134 and also by a transverse brace 136 disposed forwardly of their transverse brace member 134 utilized to support a caster wheel assembly generally referred to by the reference numeral 138. The trailing hitch 128 includes a hitch assembly 140 to which the tongue 142 of a trailer generally referred to by the reference numeral 144 is pivotally secured.

A stone pickup drum generally referred to by the reference numeral 150 is journaled between the side shields or panels 56 and 58 and includes a pair of opposite end disks 152 between which are secured a plurality of circumferentially spaced rod-like members 154. In addition, an expansion spring 158 is also supported between the sides 56 and 58 and is disposed above and slightly to the rear of the axis of rotation of the stone pickup drum 150.

First and second stone conveying means generally referred to by the reference numerals 160 and 162 are provided and supported from the rear portions 48 and 60 of the frame 12.

The stone conveying means 160 includes first and second shafts 164 and 166 which are journaled between the sides 56 and 58 and which are each provided with a pair of sprocket wheels 168. A pair of endless chains 170 are entrained over corresponding sprocket wheels 168 and have transverse members 172 secured therebetween at longitudinally spaced intervals. Each of the transverse members 172 has a plurality of outwardly projecting stone conveying members 174 secured thereto and spaced longitudinally therealong and it may be seen from FIGURE 5 of the drawings that a pivot shaft 176 is also secured between the sides 56 and 58 and has a plurality of elongated guides 178 pivotally secured thereto. The guides 178 generally parallel and are disposed above the upper reaches of the endless chains 170 and are supported at their rear ends by means of the transverse members 172. It may be seen from FIGURE 3 of the drawings that the rear ends of the guides 178 curve downwardly as at 180.

The second stone conveying means 162 includes a pair of transverse shafts 182 and 184 which are journaled between the sides 62 and 64 and each of the shafts 182 and 184 also includes a pair of sprocket wheels 186. A pair of endless chains 188 drivingly connect corresponding sprocket wheels 186 carried by the shafts 182 and 184 and also include transverse members 190 corresponding to the transverse members 172. Further, each of the transverse members 190 includes a plurality of outwardly projecting stone conveying members or elements 192 which are spaced longitudinally therealong. The stone conveying means 162 also includes a pivot shaft 194 corresponding to the pivot shaft 176 and to which corresponding ends of a plurality of elongated guides 196 corresponding to the guides 178 are pivotally secured. The free ends of the guides 196 are supported by the transverse members 190 and it may be seen that the stone conveying elements or members 172 and 192 are received between adjacent guides 178 and 196, respectively.

Figure 3:
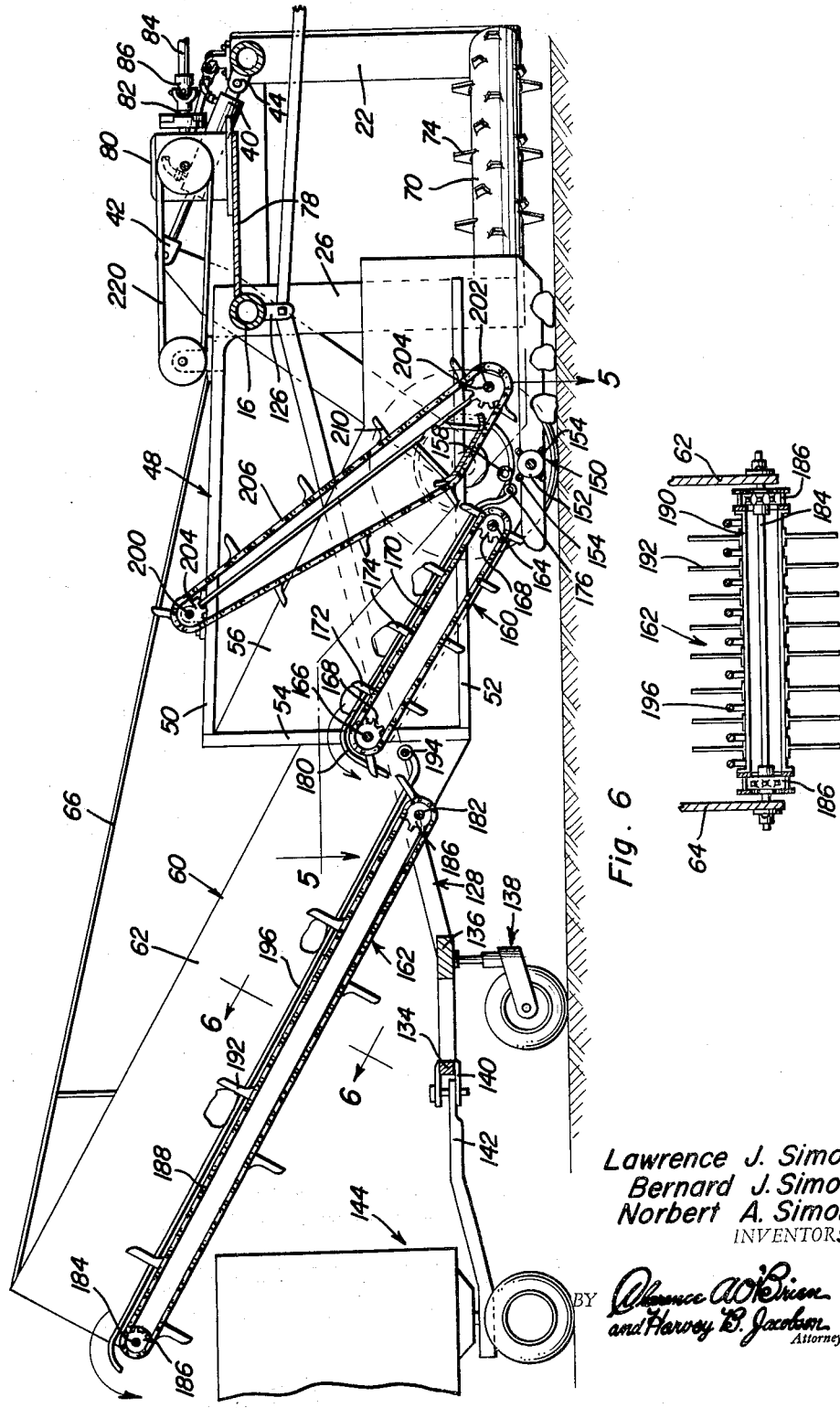
FIGURE 3 is an enlarged longitudinal vertical sectional view taken substantially upon a plane passing through the longitudinal centerline of the stone picker.
Figure 4:
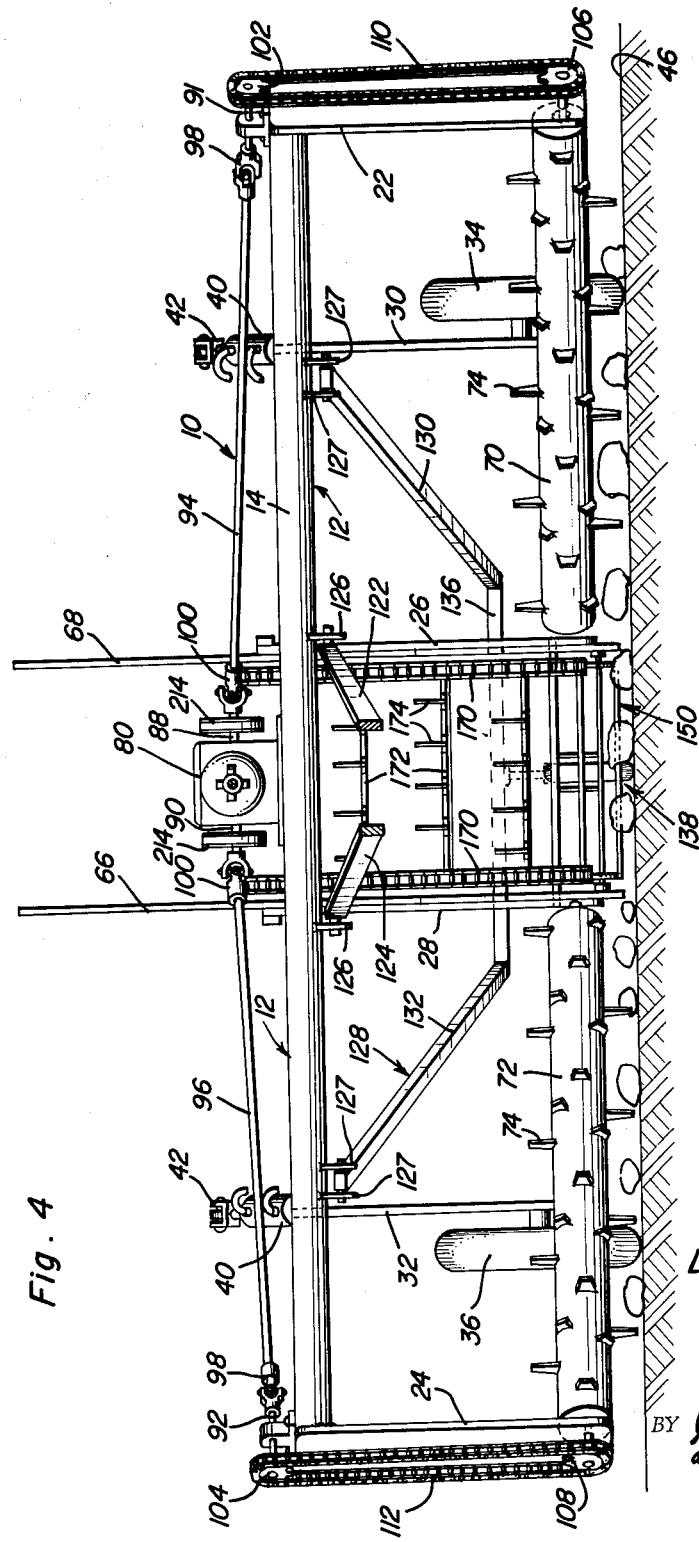
FIGURE 4 is a front elevational view of the embodiment illustrated in FIGURE 3.

With attention now directed more specifically to FIGURE 3 of the drawings it may be seen that upper and lower transverse shafts 200 and 202 are journaled between opposite sides of the rear portion 48 of the frame 12 and that each of the shafts 200 and 202 includes a pair of sprocket wheels 204. Corresponding sprocket wheels 204 are interconnected by means of endless chains 206 and the endless chains 206 are interconnected by means of transverse members 208 which also have outwardly projecting stone conveying members 210 mounted thereon and spaced longitudinally thereof for engagement with the stones which have been dug by the digging members 70 and 72.

With attention now directed more specifically to FIGURE 7 of the drawings it may be seen that each of the output shafts 88 and 90 has a drive wheel 214 mounted thereon which is aligned with a corresponding drive wheel 216 carried by a transverse shaft 218 journaled from the rear portion 48 of the frame 12. A pair of endless chains 220 drivingly connect the output shafts 88 and 90 to the transverse shaft 218 and the opposite terminal end portions of the transverse shaft 218 have a pair of sprocket wheels 222 and 224 secured thereto. The sprocket wheel 222 is aligned with a sprocket wheel 226 carried by the left end of the stone pickup drum 150 and an endless chain 228 drivingly connects the sprocket wheel 222 to the sprocket wheel 226.

The shafts 200 and 166 have sprocket wheels 230 and 232 mounted thereon which are in alignment with the sprocket wheel 224 and an endless chain 234 drivingly connects the sprocket wheel 224 to the sprocket wheels 230 and 232. The end of the shaft 166 remote from the sprocket wheel 232 has a sprocket wheel 238 mounted thereon and the corresponding end of the shaft 182 has a sprocket wheel 240 mounted thereon to which the sprocket wheel 238 is drivingly connected by means of an endless chain 242. Accordingly, rotation of the drive shaft 84 is operative to effect rotation of the digging members 70 and 72 and the shafts 166, 182 and 200 as well as the stone pickup drum 150.

In operation, the stone picking machine 10 is pulled behind the towing vehicle 120 with the digging members 70 and 72 adjusted to the desired height by means of the fluid motors 40. As the digging elements 74 dig into the ground 46 and dislodge the rocks and stones 250, the dislodged stones 250 are conveyed to the throat 260 defined between the adjacent ends of the digging members 70 and 72. There the dislodged rocks and stones 250 are discharged from the digging means and are engaged by the stone pickup drum 150 which rotates in a counterclockwise direction as viewed in FIGURE 3 of the drawings and urges the stones 250 upwardly and rearwardly. Some of the stones 250 engaged by the pickup drum 150 are also engaged by the stone conveying elements or members 210 carried by the transverse members 208 which assist in depositing the stones 250 on the first stone conveying means 160 for engagement by the stone conveying elements or members 174. As the stones 250 are elevated by means of the first stone conveying means 160, smaller particles of stone and gravel as well as soil clinging to the stones 250 are allowed to drop between the guide members 178. Then, the stones 250 are dropped onto the lower end of the second stone conveying means 162 and treated in a similar manner thereby. As the stones 250 are ejected from the upper end of the stone conveying means 162, they fall into the trailer 144 being towed by the machine 10.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A stone picking machine comprising a main frame, transversely extending stone digging means supported from the front of said frame and including means adapted to dig stones for the ground over which said machine travels and including means adapted to rearwardly discharge dug stones from the center of said transverse digging means, said machine also including stone pickup means disposed rearwardly of the point of discharge of stones for said stone digging means adapted to pick up dug stones discharged from said digging means, said stones pickup means including stone elevating means defining a plurality of inclined elongated generally parallel guides supported from said frame against substantial movement longitudinally thereof and adapted to support dug stones thereon and including stone conveying means projecting upwardly between pairs of adjacent guides and supported from transversely extending brace members mounted from said frame for movement upwardly along said stone elevating means beneath said guides and supportingly engaging said guides from beneath, said guides being adapted to slidingly support dug stones for movement therealong and said conveying means being adapted to engage the larger stones supported on said guides and to move said stones upwardly along said stone elevating means while dirt and smaller particles of stone fall between said guides.

2. The combination of claim 1 wherein said machine also includes second inclined stone-elevating means similar to the first-mentioned stone elevating means and disposed with its lower end vertically spaced below the upper end of the first-mentioned stone-elevating means to receive elevated stones discharged therefrom.

3. The combination of claim 1 including ground-engaging support wheels, means journaling said ground-engaging support wheels from said frame for rotation about axes extending transversely of said frame spaced rearwardly of said stone digging means.

4. The combination of claim 3 wherein said means journaling said wheels from said main frame includes means operable to raise and lower said wheels relative to said main frame.

5. A stone picker comprising a main frame having front and rear ends, a plurality of ground-engaging support wheels, means journaling said wheels from said main frame for rotation about axes extending transversely thereof, a pair of elongated digging members journaled from said main frame for rotation about their longitudinal axes, said elongated digging members each including generally radially extending digging elements spaced circumferentially thereabout and being forwardly divergent and spaced apart at their rear ends defining a throat therebetween, stone pickup means supported from said main frame and adapted to pick up the stones discharged into said throat, said machine also including stone pickup means disposed rearwardly of said throat adapted to pick up dug stones discharged from said digging means, said stone pickup means including stone elevating means defining a plurality of inclined elongated generally parallel guides supported from said frame against substantial movement longitudinally thereof and adapted to support dug stones thereon for movement therealong, said pickup means also including a plurality of stone conveying means projecting upwardly from between pairs of adjacent guides and supported from said frame for movement upwardly along said stone-elevating means between said guides, said stone conveying means being interconnected by means of brace members extending transversely of and disposed and extending beneath said guides, the latter being supported intermediate their opposite ends from upper surface portions of said brace members guidingly engaging undersurface portions of said guides, said guides being adapted to slidingly support dug stones for movement therealong and said conveying means being adapted to engage the larger stones supported on said guides and to move said stones upwardly along said stone elevating means while dirt and smaller particles of stone fall between said guides.

6. The combination of claim 5 wherein said machine also includes second inclined stone elevating means similar to the first-mentioned stone-elevating means and disposed with its lower end vertically spaced below the upper end of the first-mentioned stone-elevating means to receive elevated stones discharged therefrom.

7. The combination of claim 6 wherein said means journaling said wheels from said main frame includes means operable to raise and lower said wheels relative to said main frame.

8. A stone picker comprising a main frame having front and rear ends, a plurality of ground-engaging support wheels, means journaling said wheels from said main frame for rotation about axes extending transversely thereof, a pair of elongated digging members journaled from said main frame for rotation about their longitudinal axes, said elongated digging members each including generally radially extending digging elements spaced circumferentially thereabout and being forwardly divergent and spaced apart at their rear ends defining a throat therebetween, stone pickup means supported from said main frame and adapted to pick up the stones discharged into said throat, said machine also including stone pickup means disposed rearwardly of said throat adapted to pick up dug stones discharged from said digging means, said stone pickup means including stone elevating means defining a plurality of inclined elongated generally parallel guides adapted to support dug stones thereon and including stone conveying means projecting upwardly from between pairs of adjacent guides and supported from said frame for movement upwardly along said stone-elevating means between said guides, said guides being adapted to slidingly support dug stones for movement therealong and said conveying means being adapted to engage the larger stones supported on said guides and to move said stones upwardly along said stone elevating means while dirt and smaller particles of stone fall between said guides, said machine also including second inclined stone elevating means similar to the first-mentioned stone elevating means and disposed with its lower end vertically spaced below the upper end of the first-mentioned stone elevating means to receive elevated stones discharged therefrom, said means journaling said wheels from said main frame including means operable to raise and lower said wheels relative to said main frame, a pair of input shafts journaled from said frame adjacent the outer ends of said digging members for rotation about axes generally paralleling the axes of rotation of said elongated digging members, means drivingly connecting said input shafts to said digging members, a centrally disposed differential case including transversely extending output shaft means projecting from opposite sides thereof and disposed approximately half way between transverse upstanding planes containing the forward and rear ends of said digging members, said differential case also including an input shaft drivingly coupled to said transverse shaft means adapted to be driven by a suitable source of power, and a pair of drive shafts extending between the adjacent ends of said input shafts and said output shaft means and including universal joints on the opposite ends thereof drivingly coupling said transverse shaft means to the adjacent ends of said drive shafts and the remote ends of said drive shafts to the adjacent ends of said pair of input shafts.

References Cited by the Examiner

UNITED STATES PATENTS

| | | | |
|---|---|---|---|
| 1,016,740 | 2/1912 | Ellison | 198—13 |
| 2,010,335 | 8/1935 | Stoltenberg | 171—130 X |
| 2,731,782 | 1/1956 | Mason | 56—27 X |
| 2,755,612 | 7/1956 | Johnson | 171—65 |
| 2,816,614 | 12/1957 | Hier | 171—63 |
| 2,893,192 | 7/1959 | Tallman | 56—27 |

ABRAHAM G. STONE, *Primary Examiner.*

ANTONIO F. GUIDA, *Examiner.*